United States Patent Office 3,063,995
Patented Nov. 13, 1962

3,063,995
DERIVATIVES OF PYRIDOTHIADIAZINE-
1,1-DIOXIDES
Jack Bernstein, New Brunswick, and William A. Lott, Maplewood, N.J., assignors to Olin Mathieson Chemical Corporation, New York, N.Y., a corporation of Virginia
No Drawing. Filed Apr. 25, 1958, Ser. No. 730,767
12 Claims. (Cl. 260—243)

This invention relates to new chemical compounds, and more particularly to new pyridothiadiazine-1,1-dioxides, one tautomeric form of which may be represented by the Formula I:

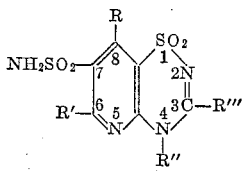

as well as the alkali metal salts thereof, wherein R and R' are hydrogen, halogen, trihalomethyl, lower alkyl, or lower alkoxy, R'' is hydrogen or lower alkyl, and R''' is hydrogen, lower alkyl, phenyl or benzyl.

The new pyridothiadiazine-1,1-dioxides of this invention are physiologically active compounds which possess both diuretic and anti-hypertensive activities. Thus, these compounds are administrable parenterally and (preferally) orally in the treatment of congestive heart failure, being uniquely suitable for this and other conditions where both the diuretic and anti-hypertensive activities are desirable.

The final products of this invention are prepared in a series of steps employing new intermediates of this invention. The first step in the process entails the reaction of a 2-aminopyridine of the general Formula II:

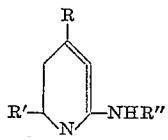

wherein R, R' and R'' are as hereinbefore defined, with at least two equivalents of chlorosulfonic acid in the presence of an alkali metal chloride (e.g. sodium chloride), the reaction preferably being conducted at an elevated temperature. Among the suitable starting materials may be mentioned: 2-aminopyridine, 4-halo-2-aminopyridines (e.g. 4-chloro-2-aminopyridine), 6-halo-2-aminopyridines (e.g. 6-chloro-2-aminopyridine), 4,6-dihalo-2-aminopyridines (e.g. 4,6-dichloro-2-aminopyridine), 4-trihalomethyl-2-aminopyridines (e.g. 4-trifluoromethyl-2-aminopyridine), 6-trihalomethyl-2-aminopyridines (e.g. 6-trifluoromethyl-2-aminopyridine), 4-(lower alkyl)-2-aminopyridines (e.g. 4-methyl-2-aminopyridine and 4-ethyl-2-aminopyridine), 6-(lower alkyl)-2-aminopyridines (e.g. 6-methyl-2-aminopyridine), 4,6-di(lower alkyl)-2-aminopyridines (e.g. 4,6-dimethyl-2-aminopyridine and 4-methyl-6-ethyl-2-aminopyridine), 4-(lower alkoxy)-2-aminopyridines (e.g. 4-methoxy-2-aminopyridine), 6-(lower alkoxy)-2-aminopyridines, 4,6-di(lower alkoxy)-2-aminopyridines, 4-(lower alkyl)-6-(lower alkoxy)-2-aminopyridines (e.g. 6-methoxy-2-amino-4-picoline), 2-(lower alkyl)aminopyridines (e.g. 2-methylaminopyridine), and 2-(lower alkyl)amino derivatives of the substituted pyridines listed hereinbefore.

The reaction results in the production of the new disulfonyl chloride intermediates of this invention of the general Formula III:

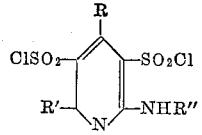

wherein R, R' and R'' are as hereinbefore defined.

These disulfonyl chlorides can then be treated with aqueous ammonia or solid ammonium carbonate to yield the corresponding disulfonamides of the general Formula IV:

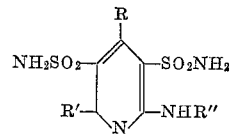

wherein R, R' and R'' are as hereinbefore defined.

If a compound wherein R''' is lower alkyl, phenyl or benzyl is desired the disulfonyl chloride can be treated prior to amidation with an acylating agent, such as an acid anhydride or acyl halide, the reaction preferably being conducted in the presence of an organic base, such as pyridine. Among the suitable acylating agents may be mentioned the acid anhydrides and acyl chlorides of the lower alkanoic acids (e.g. acetic, propionic, n-butyric; and enanthic acid), benzoic acid and phenacetic acid. The reaction results in the preparation of the 2-amido-3,5-sulfonyl chloride derivatives of this invention having the general Formula V:

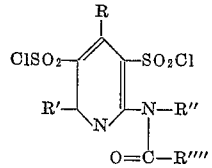

wherein R, R', and R'' are as hereinbefore defined, and R'''' is lower alkyl, phenyl or benzyl.

These amido derivatives are then treated with aqueous ammonia to yield the corresponding disulfonamide derivatives of the general Formula VI:

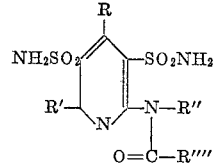

wherein R, R', R'' and R'''' are as hereinbefore defined.

To prepare the final products of this invention, wherein R''' is lower alkyl, phenyl or benzyl, the amido disulfonamides (Compounds VI) are heated, preferably to a temperature of about 100° C. to about 200° C. whereupon they cyclize. Furthermore, the final compounds can be prepared directly from the amido disulfonyl chlorides (Compounds V) by treating with aqueous ammonia and heating, thereby converting the intermediate disulfonamides in situ to the final products.

The final products may also be prepared from the amino disulfonamides (Compounds IV) by treating the latter with an acid, such as a lower alkanoic acid, benzoic acid or phenacetic acid, or the ortho ester thereof at an elevated temperature (preferably in the range of about 100° C. to about 300° C.). Although any ortho ester may be used the preferred esters are those of lower alkanols (e.g. ethanol). If R''' is to be hydrogen, then an orthoformate, such as ethyl orthoformate, is used. If R''' is to be lower alkyl, then an ortho lower alkanoic acid ester, such as ethyl orthoacetate, is chosen as the reactant. Similarly, an orthobenzoic acid ester yields a 3-phenyl derivative and an orthophenacetic acid ester yields a 3-benzyl derivative.

The final products are initially formed in the free acid form. These free acids can then, if desired, be neutralized by treatment with alcoholic alkali metal hydroxide (e.g. potassium hydroxide and sodium hydroxide), whereby the alkali metal salts are formed.

The following examples illustrate the invention (all temperatures being in centigrade):

EXAMPLE 1

1,4,2-Pyrido[2,3-e]Thiadiazine-7-Sulfonamide-1,1-Dioxide (a) *Preparation of 2-amino-3,5-pyridinedisulfonamide.*—To 100 cc. of chlorsulfonic acid is added with stirring 90 g. of sodium chloride over a period of 20 minutes. Then 20 g. (0.21 M) of 2-aminopyridine is added portionwise over a period of 20 minutes. (There is foaming and fuming with each addition.) The mixture is then heated in an oil bath to 180° and maintained there for 2 hours. When the oil bath temperature reaches 125–130°, vigorous foaming occurs and a thick pasty mass forms. After 2 hours heating, the mixture is cooled to 30° and 300 cc. of ice water and 250 cc. of ether are added with stirring. The ether layer is separated and the aqueous layer is extracted with an additional 300 cc. of ether. The ether extracts are dried over magnesium sulfate and the ether is removed by distillation. To the semi-solid residue containing 2-amino-3,5-pyridinedisulfonyl chloride is added 100 cc. of conc. aqueous $NH_3$. A vigorous reaction occurs and then the solution is heated on a steam bath for 2 hours and allowed to stand overnight. The solid is filtered to yield about 3.5 g. of crude product. After recrystallization from water the compound melts at about 192–194° dec.

(b) *Preparation of 1,4,2-pyrido[2,3-e]thiadiazine-7-sulfonamide-1,1-dioxide.*—A mixture of 2.52 g. (0.01 M) of 2-amino-3,5-pyridinedisulfonamide and 10 cc. of ethyl orthoformate is heated in an oil bath at 110–130° in an open flask for 3 hours. When the oil bath temperature reaches 115°, bubbles appear and persist for 2 hours. The solidified mass is cooled, triturated with ether and the solid filtered to yield about 2.5 g. of product. The product is purified by crystallization from water. It does not melt below about 300°.

EXAMPLE 2

Potassium Salt of 1,4,2-Pyrido[2,3-e]Thiadiazine-7-Sulfonamide-1,1-Dioxide

To a solution of 1.32 g. of 85% potassium hydroxide in 100 ml. of 95% ethanol is added gradually with shaking 2.62 g. of 1,4,2-pyrido[2,3-e]thiadiazine-7-sulfonamide-1,1-dioxide. The solid dissolves. The resulting alcoholic solution is concentrated in vacuo to yield the dipotassium salt as a free flowing granular powder.

Similarly, using the equivalent quantity of sodium hydroxide instead of potassium hydroxide, the disodium salt is obtained.

EXAMPLE 3

6-Methyl-1,4,2-Pyrido[2,3-e]Thiadiazine-17-Sulfonamide-1,1-Dioxide (a) *Preparation of 2-amino-6-methylpyridine-3,5-disulfonamide.*—To 100 cc. of chlorosulfonic acid there is added portionwise with stirring over a period of about 20 minutes 90 g. of sodium chloride. Then 20 g. (0.18 M) of 2-amino-6-methylpyridine is added portionwise over a period of 30 minutes. The reaction mixture is then heated in an oil bath at 180° for 2 hours. The mixture is cooled to 30° and 300 cc. of ice water and 300 cc. of ether are added with stirring. The aqueous layer is removed and extracted with an additional 250 cc. of ether. The ether extracts are dried over magnesium sulfate and the ether is removed by distillation. To the residue containing 2-amino-6-methylpyridine-3,5-disulfonylchloride is added 100 cc. of aqueous $NH_3$ and the mixture is heated on the steam bath for 2 hours upon cooling and filtering, 7.1 g. of product is obtained. After recrystallization from water the melting point is about 234–236° (dec.).

(b) *Preparation of 6-methyl-1,4,2-pyrido[2,3-e]thiadiazine-7-sulfonamide-1,1-dioxide.*—A mixture of 2.66 g. (0.01 M) of 2-amino-6-methylpyridine-3,5-disulfonamide and 6 cc. of ethyl orthoformate is heated in an open flask in an oil bath at 110–130° for 3 hours. The mixture is cooled, triturated with ether and the solid filtered to yield about 2.5 g. of crude product. After recrystallization from 100 cc. of water the compound melts at about 305–307° (dec.).

(b') *Alternate preparation of 6-methyl-1,4,2-pyrido-[2,3-e]thiadiazine-7-sulfonamide-1,1-dioxide.*—A solution of 4 g. of 2-amino-6-methylpyridine-3,5-disulfonamide in 100 ml. of 98–100% formic acid is refluxed for three hours and is then concentrated under reduced pressure to remove the unreacted formic acid. The oily residue is recrystallized from water to give the desired 6-methyl-1,4,2-pyrido[2,3-e]thiadiazine-7-sulfonamide 1,1-dioxide, M.P. about 305–307°.

Similarly, by substituting other 2-amino-6-(lower alkyl)-pyridines, 2-amino-6-(lower alkoxy)pyridines (e.g. 2-amino-6-methoxypyridine), 2-amino-4-(lower alkyl)-pyridines (e.g. 2-amino-4-methylpyridine), 2-amino-6-halopyridines (e.g. 2-amino-6-chloropyridine), 2-amino-6-trifluoromethyl-pyridine (e.g. 2-amino-6-trifluoromethylpyridine), or 2-amino-4,6-di(lower alkyl) pyridines (e.g. 2-amino-4,6-dimethylpyridine) for the 2-amino-6-methylpyridine in part a of Example 3 and following the procedure of either b or part b', there is obtained the respective 6-, 8-, or 6,8-substituted 1,4,2-pyrido[2,3-e]thiadiazine-7-sulfonamide-1,1-dioxides derivatives.

EXAMPLE 4

4-Methyl-1,2,4-Pyrido[2,3-e]Thiadiazine-7-Sulfonamide-1,1-Dioxide (a) *Preparation of 2-methylamino-3,5-pyridinedisulfonamide.*—To 100 cc. chlorsulfonic acid is added with stirring 90 g. sodium chloride over a period of 20 minutes. Then 21.6 g. (0.2 M) 2-methylaminopyridine is added portionwise over a period of 20 minutes. The mixture is then heated in an oil bath to 180° and kept there for two hours. After cooling to 30° about 250 cc. ice water and 250 cc. ether are added with stirring. The ether layer is separated and the aqueous layer extracted with 250 cc. ether. The ether is dried over $MgSO_4$ and removed by distillation. To the residue is added 100 cc. of concentrated ammonia. A vigorous reaction occurs and then the mixture is heated on a steam bath for 2 hours, and allowed to cool. The solid which precipitates is filtered and air dried and can be recrystallized from water.

(b) *Preparation of 4-methyl-1,2,4-pyrido[2,3-e]thiadiazine-7-sulfonamide-1,1-dioxide.*—A mixture of 2.66 g. (0.01 M) 2-methylamino-3,5-pyridine-disulfonamide and 10 cc. ethyl orthoformate is heated in an open flask in an oil bath for 3 hours. When the temperature reaches about 120°, bubbles appear and last for 2 hours. The reaction mixture is cooled and triturated with ether and the solid filtered to yield about 2.5 g. of product. The product can be purified by recrystallization from water.

EXAMPLE 5

3-Propyl-6-Methyl-1,4,2-Pyrido[2,3-e]Thiadiazine-7-Sulfonamide-1,1-Dioxide (a) *Preparation of 2-amino-6-methylpyridine-3,5-di-*

*sulfonyl chloride.*—To 100 cc. of chlorosulfonic acid there is added portionwise with stirring, during a period of thirty minutes, 90 g. of sodium chloride. Then 20 g. of 2-amino-6-methylpyridine is added portionwise during a period of 30 minutes. The reaction mixture is then heated in an oil bath at 180° for two hours. The reaction mixture is cooled to 30° and 300 cc. of ice-water and 300 cc. of ether is added with stirring and cooling. The aqueous layer is separated and extracted with ether. The combined ether extracts are dried over anhydrous magnesium sulfate and the ether then removed by distillation. The residue, 2-amino-6-methylpyridine-3,5-disulfonylchloride, can be purified by crystallization from a mixture of benzene and hexane.

(*b*) *Preparation of 2-butyrylamino-6-methylpyridine-3,5-disulfonylchloride.*—A mixture of 10 g. of 2-amino-6-methyl-pyridine-3,5-disulfonyl chloride and 25 ml. of n-butyric anhydride is warmed on a steam-bath for 30 minutes and then cooled to room temperature. The excess butyric anhydride is removed by distillation under reduced pressure and the residue is triturated with dry hexane. The 2-butyrylamino-6-methyl-pyridine-3,5-disulfonylchloride may be used without purification for conversion to the corresponding disulfonamide. If desired, it may be purified by crystallization from a mixture of benzene and hexane.

(*c*) *Preparation of 3-propyl-6-methyl-1,4,2-pyrido[2,3-e]-thiadiazine-7-sulfonamide-1,1-dioxide.*—A mixture of 5 g. of 2-butyrylamine-6-methylpyridine-3,5-disulfonylchloride and 50 ml. of concentrated aqueous ammonia is warmed on a steam-bath and heated to dryness. The residue is then heated at 180° for two hours, cooled and crystallized from aqueous alcohol to give the desired 3-propyl-6-methyl-1,4,2 - pyrido[2,3-e]thiadiazine-7-sulfonamide-1,1-dioxide.

Similarly, by substituting other acylating agents for the n-butyric anhydride in step *b* of Example 5, the corresponding 3-substituted derivatives are formed. Thus, acetic anhydride, benzoyl chloride and phenacetyl chloride yield respectively 3,6-dimethyl-1,4,2-pyrido[2,3-e]thiadiazine-7-sulfonamide-1,1-dioxide, 3-phenyl-6-methyl-1,4,2-pyrido[2,3-e]thiadiazine - 7 - sulfonamide-1,1-dioxide, and 3-benzyl-6-methyl-1,4,2-pyrido[2,3-e]thiadiazine-7-sulfonamide-1,1-dioxide.

The invention may be variously otherwise embodied within the scope of the appended claims.

What is claimed is:
1. A compound selected from the group consisting of pyridothiadiazine-1,1-dioxides of the formula

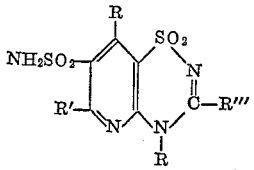

and alkali metal salts thereof, wherein R and R' are selected from the group consisting of hydrogen, halogen, trihalomethyl, lower alkyl and lower alkoxy, R'' is selected from the group consisting of hydrogen and lower alkyl, and R''' is selected from the group consisting of hydrogen, lower alkyl, phenyl and benzyl.

2. 1,4,2-pyrido[2,3-e]thiadiazine - 7 - sulfonamide-1,1-dioxide.

3. An alkali metal salt of 1,4,2-pyrido[2,3-e]thiadiazine-7-sulfonamide-1,1-dioxide.

4. 6-methyl-1,4,2-pyrido[2,3-e]thiadiazine - 7 - sulfonamide-1,1-dioxide.

5. 4-methyl-1,4,2-pyrido[2,3-e]thiadiazine - 7 - sulfonamide-1,1-dioxide.

6. 3-propyl-6-methyl - 1,4,2 - pyrido[2,3-e]thiadiazine-7-sulfonamide-1,1-dioxide.

7. A compound of the formula

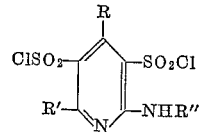

wherein R and R' are selected from the group consisting of hydrogen, halogen, trihalomethyl, lower alkyl and lower alkoxy, and R'' is selected from the group consisting of hydrogen and lower alkyl.

8. 2-amino-3,5-pyridinedisulfonyl chloride.

9. 2-amino-6-(lower alkyl)pyridine - 3,5 - disulfonyl chloride.

10. A compound of the formula

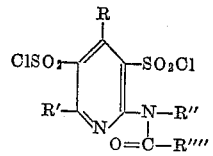

wherein R and R' are selected from the group consisting of hydrogen, halogen, trihalomethyl, lower alkyl and lower alkoxy, R'' is selected from the group consisting of hydrogen and lower alkyl, and R'''' is selected from the group consisting of lower alkyl, phenyl and benzyl.

11. A compound of the formula

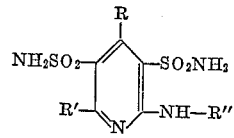

wherein R and R' are selected from the group consisting of hydrogen, halogen, trihalomethyl, lower alkyl and lower alkoxy, and R'' is selected from the group consisting of hydrogen and lower alkyl.

12. A compound of the formula

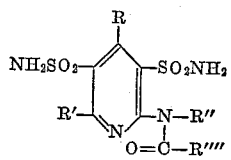

wherein R and R' are selected from the group consisting of hydrogen, halogen, trihalomethyl, lower alkyl and lower alkoxy, R'' is selected from the group consisting of hydrogen and lower alkyl, and R'''' is selected from the group consisting of lower alkyl, phenyl and benzyl.

References Cited in the file of this patent
UNITED STATES PATENTS 2,809,194   Novello  ---------------- Oct. 8, 1957
2,910,476   Novello  ---------------- Oct. 27, 1959

UNITED STATES PATENT OFFICE
CERTIFICATE OF CORRECTION

Patent No. 3,063,905                          November 13, 1962

Jack Bernstein et al.

It is hereby certified that error appears in the above numbered patent requiring correction and that the said Letters Patent should read as corrected below.

Column 1, lines 38 to 44, Formula II should appear as shown below instead of as in the patent:

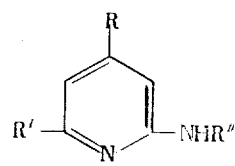

column 2, lines 3 to 8, Formula III should appear as shown below instead of as in the patent:

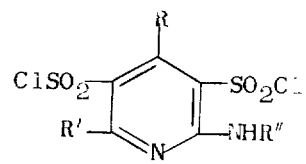

lines 14 to 19, Formula IV should appear as shown below instead of as in the patent:

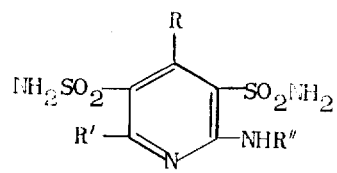

lines 35 to 40, Formula V should appear as shown below instead of as in the patent:

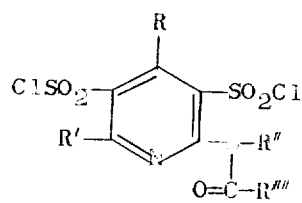

3,063,995 lines 46 to 52, Formula VI should appear as shown below instead of as in the patent:

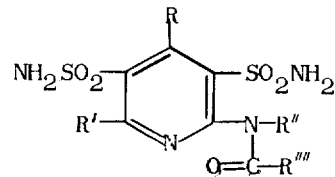

column 5, lines 50 to 56, the formula should appear as shown below instead of as in the patent:

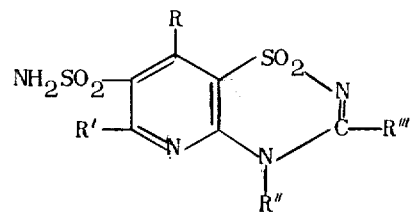

Signed and sealed this 7th day of May 1963.

(SEAL)
Attest:

ERNEST W. SWIDER
Attesting Officer

DAVID L. LADD
Commissioner of
Patents